April 15, 1952 M. R. MATHESON 2,593,163
VARIABLE-SPEED TRANSMISSION
Filed Nov. 1, 1949
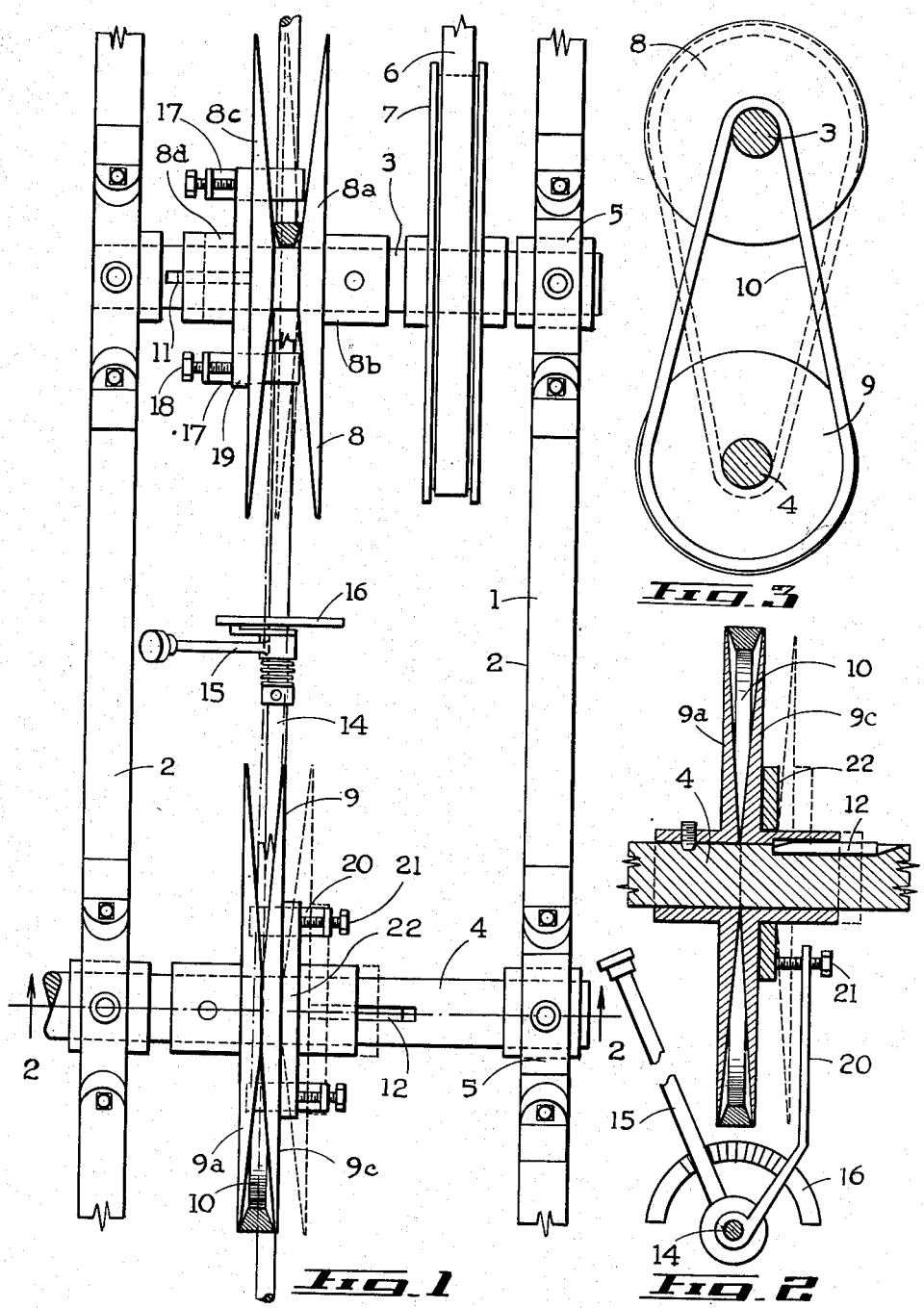
Inventor·
MacKAY ROSS MATHESON
by W. Sim Haskett.
Attorney Patented Apr. 15, 1952

2,593,163

UNITED STATES PATENT OFFICE 2,593,163

VARIABLE-SPEED TRANSMISSION

Mackay Ross Matheson, Leamington, Ontario, Canada

Application November 1, 1949, Serial No. 124,777

2 Claims. (Cl. 74—230.17)

This invention relates to a variable speed transmission and appertains particularly to one employing a belt and pair of two-part cone pulleys.

An object of the invention is to provide an improved variable speed conical disk drive affording the maximum range of speed ratio consistent with a simple structure utilizing a minimum number of parts.

A further object of the invention is to provide a variable speed drive having a novel and efficient speed change control.

A further object of the invention is to provide a variable speed transmission of the belt and cone pulley type that will retain any set speed ratio and thus limit to a very fine tolerance the variation in the R. P. M.'s of the driven shaft.

To the accomplishment of these and related objects as shall become apparent as the description proceeds, the invention resides in the construction, combination and arrangement of parts as shall be hereinafter more fully described, illustrated in the accompanying drawings, and pointed out in the claims hereunto appended.

The invention will be best understood and can be more clearly described when reference is had to the drawings forming a part of this disclosure wherein like characters indicate like parts throughout the several views.

In the drawings:

Figure 1 is a plan view of a preferred embodiment of the invention, with the V-belt shown in section;

Figure 2 is a transverse vertical section through one of the pulleys and control mechanism, as along line 2—2 of Figure 1, looking in the directions indicated by the arrows; and Figure 3 is a sectional elevational diagram, on a reduced scale, with the near half of each pulley removed, showing the extreme positions assumed by the pulley-connecting belt.

Variable speed transmission devices of the expandable V-belt pulley type have usually been too cumbersome to be adaptable to small machines and the ratio varying control too complicated to be suitable for general use or too loose to permit of precise setting that would enable its adjustment to produce an exact desired R. P. M. in the driven shaft.

In this invention, which is designed particularly for use in special installations such as the drive for a magneto test panel where a wide variation in speed is required as well as the retention of a precise selected R. P. M. of the driven shaft, but adaptable to a wide range of uses such as the cylinder drive in a grain combine, lathes, press drills, etc., a new and simple speed ratio control is shown providing for a very accurate ratio setting as through adjustable pressure controls, so that the driven shaft may be turned up to and held at the exact R. P. M. desired.

Referring to the preferred embodiment of the invention shown in the drawings, the framework includes a pair of side rails 2 whereon spaced parallel driving and driven shafts 3 and 4 are supported in self-aligning bearings 5 on said rails. The driving shaft 3 is rotated from any available power source as by the drive belt 6 on the pulley 7.

On each of the shafts 3 and 4 is a two-part cone pulley 8 and 9 respectively, operatively connected by an endless V-belt 10. The pulley 8 comprises a half pulley part 8a in the form of a disk, tapered or cone like on one side and fixedly mounted on the shaft 3 by a coaxial annular flange 8b, and a second and complementary half pulley part 8c in the form of a disk with a hub flange 8d slidable longitudinally of the shaft on a key 11 and having a tapered or conical face on its inner side confronting the tapered side of the fixed pulley half 8a and adjustable toward and away from the same. The pulley 9 is similarly composed of complementary and separable fixed and slidable half parts 9a and 9c respectively with the latter slidable along the shaft 4 on a key 12 but the fixed and slidable halves of the pulley 9 are on the opposite or reverse side to the corresponding parts of pulley 8. The pulleys 8 and 9 thus each provide a tapered groove for the V-belt 10 and their complementary parts may be compressed or expanded to force the belt toward the circumference or allow it to move toward the shaft.

To adjust the slidable parts of the pulleys 8 and 9 and to permit them to move in unison, so that as one moves toward its fixed companion the other moves away from its fixed half, I provide a ratio changing or control shaft 14 paralleling the side rails of the frame 1 and running transversely of the shafts 3 and 4, preferably lying substantially beneath the belt 10. A manual shift rod 15 non-rotatable on the shaft 14, operates against a frictional holding device such as the toothed segment 16 to temporarily secure the said control shaft 14 in any desired rotative position. Secured on and radially extending also from the said control shaft is a spaced pair of arms 17, substantially registering with the shaft 3, one arm running to either side thereof and terminally carrying a pressure adjusting bolt 18 threaded therethrough. These arms extend laterally beyond the outer side of the slidable half part 8c of the pulley 8 and the screws 18 operate toward the outer face of the said slidable half part 8c to engage an annular thrust bearing 19 concentric on the hub flange 8d. A similar pair of arms 20, registering with the shaft 4 extend from the control shaft 14 and with pressure adjusting screws 21 in their free ends operate against a thrust bearing ring 22 on the hub flange of the slidable half part of the pulley 9. It will be noted that the respective pairs of arms 17 and 20 extend from the control shaft 14 to divergent angles as they operate against the outer faces of the oppositely or reversely positioned sliding half parts 8c and 9c of the pulleys.

On the shifting of the lever 15 to rotate the control shaft 14, one pair of radial arms presses against the outer face of the sliding half part of their corresponding pulley to cause it to advance while the other pair of arms operates to hold the sliding half part of the other pulley against more than a comparable retirement. Thus is one two-part pulley compressed as the other is simultaneously allowed to separate, synchronizing the increasing and decreasing radii thereof and maintaining a substantially constant tension on the belt. Accordingly, the speed ratio of the shafts 3 and 4 may be progressively varied as desired within the extreme limits allowed and, furthermore, the rotation of the driven shaft may be raised or lowered to the exact speed desired and maintained thereat by the careful shifting of the lever 15.

As regards the specific form of the V-belt 10 and the adjustable two-part pulleys 8 and 9 therefor, I have found the conventional belt and pulleys with a taper of approximately 17 degrees quite inadequate as this limits the diameter of pulleys using a standard one-half inch belt to a maximum diameter of about four inches. By employing in the belt and pulleys a greatly reduced taper of approximately 7½ degrees or within a range say of 5-12 degrees, pulleys of much larger diameter can be employed giving a wider variation of speeds and with less movement of the ratio changing parts.

From the foregoing description taken in connection with the accompanying drawings, it will be manifest that a variable speed transmission is provided that will fulfil all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

The embodiments of the invention in which an exclusive property or privilege is claimed are defined as follows:

1. In a variable speed transmission; a driving shaft and a driven shaft; a two-part cone pulley on each shaft, one part of each pulley being fixed on its shaft and the other part slidable on its shaft, said fixed and slidable parts being in reversed position on the said respective shafts; an endless V-belt operatively connecting said pulleys; a manually rotatable control shaft substantially paralleling said belt; arms extending radially and at divergent angles from said control shaft in substantial registry with each of said pulley shafts; and pressure adjusting screws on the outer ends of said arms operating against the outside faces of said respective and reversely positioned slidable pulley parts.

2. In a variable speed transmission; a driving shaft and a driven shaft; a two-part cone pulley on each shaft, one part of each pulley being fixed on its shaft and the other part slidable on its shaft, said fixed and slidable parts being in reversed position on the said respective shafts; an endless V-belt operatively connecting said pulleys; a manually rotatable control shaft extending beneath said driving and driven shafts and transversely thereof and substantially underlying said belt; radial arms extending from said control shaft and at divergent angles, in substantial registry with each of said respective pulley shafts; and pressure applying screws threaded through the free ends of each of said arms having adjustable connection with the outer faces of the respective slidable parts of said pulleys.

MACKAY ROSS MATHESON.

REFERENCES CITED

The following references are of record in the file of this patent:

UNITED STATES PATENTS

| Number | Name | Date |
|---|---|---|
| 641,281 | Edison | Jan. 16, 1900 |
| 692,120 | Conner | Jan. 28, 1902 |
| 1,993,547 | Heyer | Mar. 5, 1935 |